United States Patent [19]

Smith

[11] Patent Number: 5,856,903
[45] Date of Patent: Jan. 5, 1999

[54] MATCHING OVERCURRENT CHARACTERISTIC CURVES

[75] Inventor: James J. Smith, Bethlehem, Pa.

[73] Assignee: General Electric Company, Schenectady, N.Y.

[21] Appl. No.: 968,363

[22] Filed: Nov. 12, 1997

[51] Int. Cl.$^6$ ....................................... H02H 7/09
[52] U.S. Cl. ........................... 361/96; 361/93; 361/87; 702/58
[58] Field of Search .................... 361/62, 63, 78, 361/79, 87, 89, 93–96, 97; 364/184, 140.04, 528.27, 528.28; 702/58

[56] References Cited

U.S. PATENT DOCUMENTS

| | | | |
|---|---|---|---|
| 3,946,281 | 3/1976 | Llona et al. | 317/36 |
| 4,219,860 | 8/1980 | DePuy | 361/94 |
| 4,245,318 | 1/1981 | Eckart et al. | 364/481 |
| 4,432,031 | 2/1984 | Premerlani | 361/97 |
| 4,694,374 | 9/1987 | Verbanets, Jr. et al. | 361/96 |
| 4,722,059 | 1/1988 | Engel et al. | 364/483 |
| 4,937,757 | 6/1990 | Dougherty | 364/492 |

*Primary Examiner*—Jeffrey Gaffin
*Assistant Examiner*—Kim Huynh
*Attorney, Agent, or Firm*—Duane, Morris & Heckscher, LLP; Carl B. Horton

[57] ABSTRACT

A method for configuring a digital overcurrent relay to provide a plurality of selectable time overcurrent characteristic responses corresponding to a plurality of target curves. According to one embodiment, a template curve is selected from the plurality of target curves, and a scaling factor is generated for each remaining target curve, wherein the relay comprises means for generating approximated curves from a given template curve and a given scaling factor. It is determined whether each approximated curve is within a threshold amount of total error with respect to its corresponding target curve. If any approximated curves are above the threshold amount, then a further template is selected from the plurality of target curves, and scaling factors are again generated and adjusted for the further template curve, until no approximated curves are above the threshold amount.

12 Claims, 3 Drawing Sheets

MATCHING OVERCURRENT CHARACTERISTIC CURVES

BACKGROUND OF THE INVENTION

1. Field of the Invention

The present invention relates to digital time overcurrent relay devices, and, in particular, to matching selected overcurrent characteristic curves.

2. Description of the Related Art

Relay devices, commonly referred to as relays, are widely used in many applications, such as providing overcurrent protection for industrial and utility power systems. Typical uses include protection of utility and industrial feeders from phase and ground faults, and short circuit and overload protection for transformers, AC machines, transmission lines, or facilities with medium voltage switchgear. Such relays typically include both overcurrent detection circuitry that generates a trip control signal after overcurrent is detected, and a trip circuit to energize a breaker trip circuit when the trip control signal is generated.

The overcurrent detected may be based on a time or instantaneous overcurrent (known as TOC and IOC, respectively). Thus, for example, whenever a TOC condition or event is detected, the overcurrent detection circuitry generates a trip control signal, which is applied to the trip circuit. When the trip circuit receives the trip control signal, the trip circuit causes an appropriate circuit breaker to trip, thus protecting the device or system in which an overcurrent has been detected.

Relays typically provide several selectable TOC characteristic responses, each of which corresponds to one of a family or plurality of time overcurrent characteristic curves, or TOC curves, which plot time versus current. Each curve of a family of TOC curves is typically an inverse-time characteristic curve. See, e.g., IEEE Standard Inverse-Time Characteristic Equations for Overcurrent Relays, Designation C37.112-1996 (available from the IEEE, 1-800-678-IEEE, 445 Hoes Lane, P.O. Box 1331, Piscataway, N.J. 0885-1331, USA), which defines the inverse-time characteristics of overcurrent relays.

To implement an inverse-time TOC curve, relays typically perform RMS sensing or are provided with the RMS current, and begin to integrate current over time after an initial threshold, or "pick-up," current level is exceeded. For example, after pick-up occurs, the relay may trip if an RMS current of 2 Amps is detected for 1.5 seconds, or, alternatively, if an RMS current of 20 Amps is detected for 0.15 seconds. Thus, a larger average RMS current generally causes the relay to trip, due to a detected TOC condition, in a shorter time.

Many families of pre-established inverse-time TOC curves have been published. It is often desirable for a relay to offer at least one set of selectable TOC characteristic responses that conform to an established set of published TOC curves. A typical TOC curve family comprises eleven TOC curves, for example. Each curve of a TOC curve family typically corresponds to a different "time dial" setting, such as time dial settings ½, 1, 2, 3, 4, 5, 6, 7, 8, 9, and 10. A higher time dial setting slows down the time overcurrent response, and vice-versa. Each curve of the family is plotted in terms of time versus current, where current is specified in multiples of pick-up setting. In practical implementations, each curve is typically plotted from a point just past a unity pick-up multiple setting, e.g. a multiple of 1.5 pick-up settings.

The curves of the family have similar, but not necessarily identical, shapes—for example, curves at the higher time dial settings are typically somewhat more linear than curves at the lower time dial settings. One reason for the difference in curve shapes within a curve family is that in electromechanical (analog) relays, physical devices like springs, and other related mechanical aspects of such relays, cause curve shape to change as time dial settings are changed.

There is a need to replace electro-mechanical relays with digital relays that do not require the routine calibration required by electromagnetic relays. Digital relays are also less susceptible to vibration than electro-mechanical relays. It is desirable, therefore, to provide digital relays that provide multiple selectable TOC curves, which conform to an established, or "target," set of TOC curves, for example, a published curve family, or curve family implemented by an existing device or set of devices. Digital relays typically implement the integration function by running an accumulator which accumulates values calculated from sampled RMS current values. If the digital relay provides TOC curves that conform to established set of published or target TOC curves, then existing electro-mechanical relays that may be replaced with digital relays without the necessity of reco-ordinating the entire system.

Digital relays typically implement a given TOC curve by storing, typically in a ROM look-up table or other type of memory or storage device, a set of data points that approximate the curve. However, for multiple curves of a family of curves, the memory requirements associated with storing data points for all the curves can be prohibitively expensive or otherwise undesirable.

SUMMARY OF THE INVENTION

There is provided herein a method for configuring a digital overcurrent relay to provide a plurality of selectable time overcurrent characteristic responses corresponding to a plurality of target curves. According to one embodiment of the invention, a template curve is selected from the plurality of target curves, and a scaling factor is generated for each remaining target curve, wherein the relay comprises means for generating approximated curves from a given template curve and a given scaling factor. It is determined whether each approximated curve is within a threshold amount of total error with respect to its corresponding target curve. If any approximated curves are above the threshold amount, then a further template is selected from the plurality of target curves, and scaling factors are again generated and adjusted for the further template curve, until no approximated curves are above the threshold amount.

DESCRIPTION OF THE PREFERRED EMBODIMENT

Figure 1:
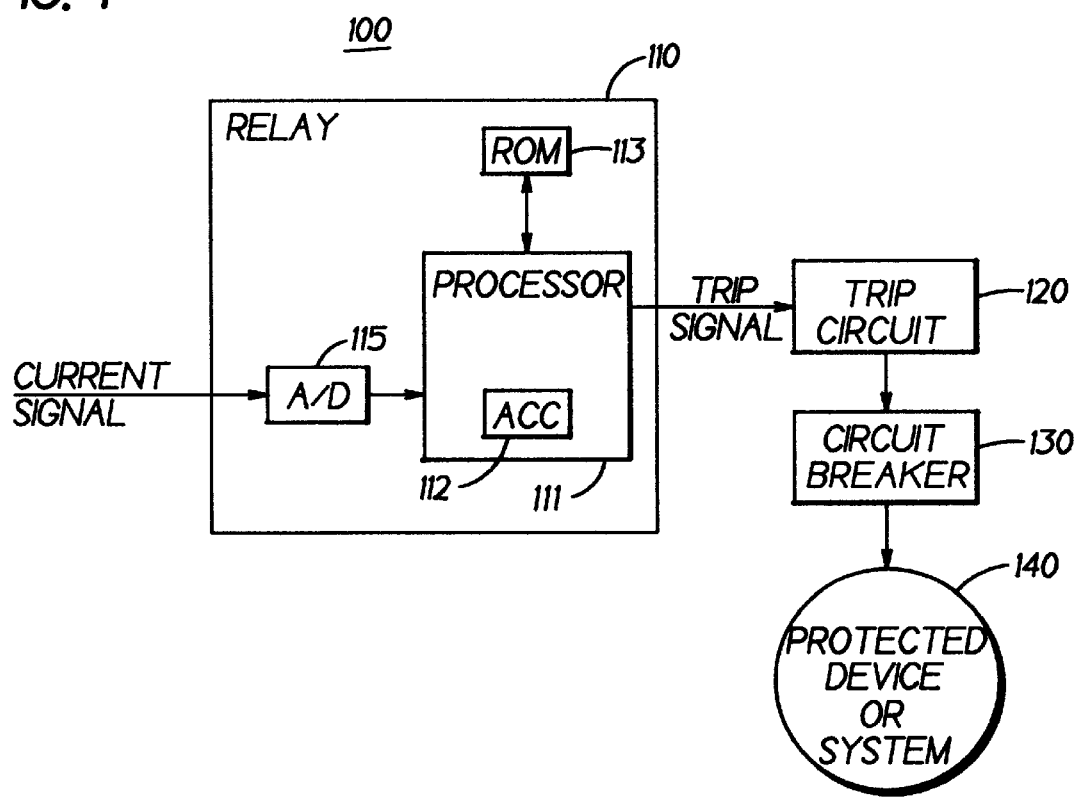
FIG. 1 is a block diagram of a relay system having an overcurrent relay, according to one embodiment of the present invention.

Referring now to FIG. 1, there is shown a block diagram of a relay system 100 having a digital overcurrent relay 110 in accordance with the present invention. Relay system further includes trip circuit 120, circuit breaker 130, and protected device or system 140. Overcurrent relay 110 includes ROM 113, processor 111 having accumulator 112, and analog-to-digital (A/D) device 115. Relay 110 is preferably a single phase, digital microprocessor based, self-powered, non-directional overcurrent relay, which can operate at either 50 Hz or 60 Hz.

A/D 115 receives an analog current signal which is to be monitored by relay 110 for an overcurrent condition. A/D 115 samples and converts the input current signal to digital values, which are provided to processor 111. As described in further detail below, processor 111 implements a given TOC curve, for example as selected by a user from a family of curves. Processor 111 begins to integrate, or accumulate, the RMS current magnitude in accumulator 112, once a pick-up condition occurs (i.e., once a threshold pick-up current is exceeded). Processor 111 periodically compares the accumulated RMS current magnitude and elapsed time since pick-up against the relevant value of the current selected TOC curve, to determined whether a time overcurrent condition has occurred.

When a time overcurrent condition is detected by processor 111, in accordance with the current selected TOC curve, processor 111 generates a trip signal, which is received by trip circuit 120. When trip circuit 120 receives the trip signal, it trips breaker 130, which causes breaker 130 to open one or more breaker main contacts (not shown) in order to protect device or system 140, which is typically the device or system in which an overcurrent was detected.

Figure 2:
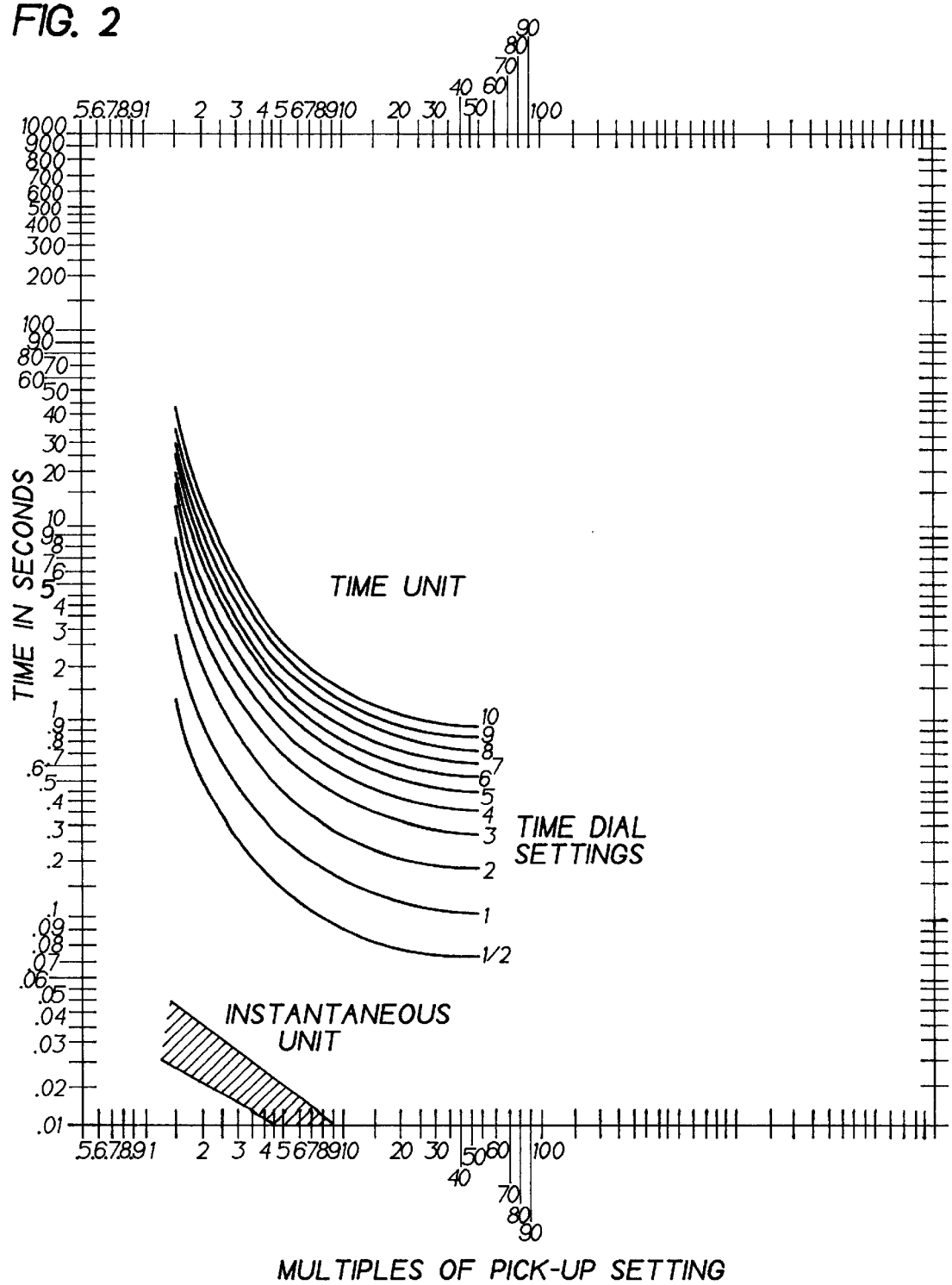
FIG. 2 is a representative TOC curve family implemented by the overcurrent relay of FIG. 1.

Referring now to FIG. 2, there is shown a graph containing a representative TOC curve family 200, implemented by overcurrent relay 110 of FIG. 1. As will be understood, TOC curve family 200 is a pre-established, published inverse-time characteristic curve family. Each individual TOC curve of curve family 200 is associated with a different time dial setting. In particular, the curves of TOC curve family 200 correspond to time dial settings ½, 1, 2, 3, 4, 5, 6, 7, 8, 9, and 10. The curves of TOC curve family 200 have similar, but not identical, shapes. As will be appreciated, a higher time dial setting slows down the time overcurrent response, and vice-versa. As will be appreciated, the time dial setting can be used by the user of relay 110 to move the bias of the curve up and down, so as to achieve a different time response (i.e. slower or faster). The pick-up setting can be set independently by the user. For example, the pick-up may be set at 1 Amp.

Thus, if time dial setting 1 is selected, so that relay 110 implements the time dial setting 1 curve of curve family 200, and if a pick-up of 1 Amp is selected by the user, then when the RMS value of the current detected by processor 111 exceeds an initial pick-up value, accumulator 112 begins to accumulate value. (The initial pick-up is approximately 1.5 times pick-up, as illustrated in FIG. 2, since values below this accumulate such a small relative amount since an extremely long time would be needed to cause an overcurrent to be detected.) For example, at these pick-up and time dial settings for curve family 200, after pick-up occurs, relay 110 trip will ideally trip if an RMS current of 2 Amps is detected for approximately 1.3 seconds. As another example, relay 110 will also trip if an RMS current of 20 Amps is detected for 0.13 seconds.

In order to implement a given curve function, a digital relay such as relay 110 typically will take a set of data values or points representative of the selected curve, and interpolate between these points to provide a complete curve that approximates the desired curve. For example, ROM 113 may be used as a ROM look-up table to store 18 points, each represented by a 16-bit value, which approximate the curve for time dial setting 10, or "curve 10".

It is possible for data points for all eleven curves to be stored in ROM 113, so that any curve selected from curve family 200 can be approximated by processor 112 by interpolating between the data points for the selected curve, as explained above. However, in a preferred embodiment of the present invention, ROM 113 does not store data points for every curve of curve family 200 (due, for example, to prohibitive memory costs), but only stores data points for a proper subset of the curves of curve family 200. The subset of curves is used as a set of template curves by relay 110 to generate curves of curve family 200 that are not actually represented in ROM 113. In this application, the subset of curve family 200 for which data points are stored in ROM 113 may be referred to as the set of template curves, and all other curves of curve family 200 may be referred to as omitted curves. As explained in further detail below with reference to FIG. 3, ROM 113 also stores a plurality of adjusted scaling factors which are used by relay 110 to generate omitted curves from one or more template curves, when a user selects one of the omitted curves. An omitted curve which is generated based on a template curve and an adjusted scaling factor, as described below with reference to FIG. 3, may be referred to herein as a generated curve.

For example, given curve 5 as a template curve, an appropriate scaling factor may be applied to the data points for curve 5 to vertically move the curve down to the approximate vertical position of curve 4. In practical embodiments, such scaling is actually done by processor 111 adjusting the accumulation or integration or current by accumulator 112 by the same ratio or factor.

Thus, relay 110 provides a set of selectable TOC characteristic responses, that match within a certain degree of accuracy the TOC characteristic responses which correspond to "target" curve family 200, by producing either template curves or generated curves, depending on the curve selected by the user. In other words, relay 110 generates an approximated family of curves, containing both template curves and generated curves which are generated from the template curves and the adjusted scaling factors, where each approximated curve of the approximated family of curves matches its corresponding curve in curve family 200 within a certain degree of accuracy. In one embodiment, the template curves and adjusted scaling factors are selected so as to minimize the number of template curves and also so as to ensure that each approximated curve matches its corresponding curve in curve family 200 within a specified degree of accuracy. This matching may also be referred to as ensuring that the approximated curve family matches curve family 200 within a specified degree of accuracy. In one embodiment, the template curves and adjusted scaling factors are selected to ensure that the approximated curve family matches curve family 200 within an accuracy of 7%.

Figure 3:
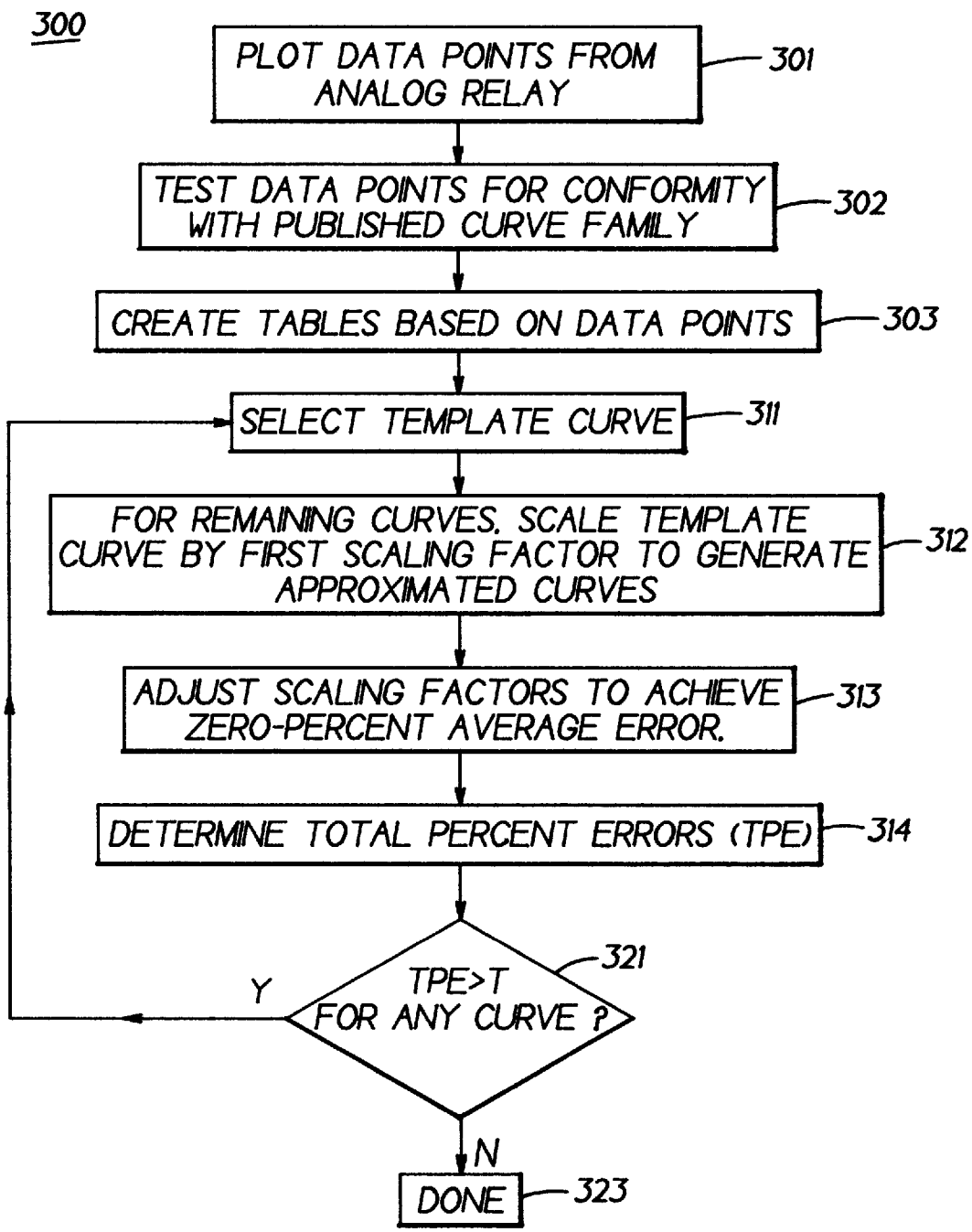
FIG. 3 is a flowchart illustrating the method of configuring the overcurrent relay of FIG. 1 to implement the TOC curve family of FIG. 2 within a specified degree of accuracy, according to one embodiment of the present invention.

Referring now to FIG. 3, there is shown a flowchart 300 illustrating the method of configuring relay 110 to implement curve family 200 within a specified degree of accuracy, according to one embodiment of the present invention. First, a set of data points corresponding to each curve of curve family 200 is obtained. In one embodiment, the set of data points is obtained by plotting data points from an existing electro-mechanical relay that is itself designed to implement curve family 200 (step 301 of FIG. 3). Then, the set of data points so obtained is tested to ensure conformity with the published curve family 200 (step 302), within a specified degree of accuracy, such as 7%. Thereafter, a set of data tables may be created to represent the set of data points for curve family 200 (step 303).

As will be appreciated, one reason for using data points from an existing analog relay is that it may be desired to match the actual curves provided by existing analog relays, even if the analog relays do not exactly match published curves, since digital relays can be used to replace such analog relays. Thus, in one embodiment, the curve family that is desired to be matched by relay 110 is the curve family actually implemented by existing electro-mechanical devices. Alternatively, the curve family that is to be matched by relay 110 is an actual published curve family. In the embodiment illustrated in FIG. 3, where it is desired to match the curves of existing analog devices, if it is found (in step 302) that such devices' curves do conform with published curves, then such published curves themselves may be used to generate the table in step 303, rather than actually plotting characteristics of the analog relays. In the present invention, therefore, curve family 200 may be considered to be some target curve family that is to be emulated by relay 110, whether curve family 200 corresponds to an ideal, published curve family, or to the actual characteristics of one or more analog relay devices.

A template curve is then selected out of curve family 200 (step 311). For example, curve 10 may be selected as the first template curve. Curve 10 is already within the specified degree of accuracy, due to the testing of step 302, and need not be tested again. Next, for each of the remaining curves which have not yet been selected as template curves (i.e., the current set of omitted curves), the current template curve (curve 10) is scaled by a first scaling factor to generate approximated curves (step 312).

In one embodiment, the first scaling factor selected for each such scaling operation is the ratio of the time dial settings for the respective curves. Thus, for example, to generate an approximated curve 9 using curve 10 as a template curve, curve 10 is scaled by a factor of 9/10=0.9. Similarly, approximated curve 4 is generated by scaling curve 10 by a first scaling factor of 4/10=0.4. As will be appreciated, this first scaling of curve 10 to generate an approximated curve 4 effectively multiplies by 0.4 the value of each of the 18 data points that represent curve 10, and thus effectively lowers the curve 10 down to the curve 4 level as curve family 200 is plotted in FIG. 2. As will be further appreciated, as explained above, such scaling may be implemented by processor 111 adjusting the accumulation or integration or current by accumulator 112 by the scaling factor, rather than actually changing the value of the template curve's data points.

After generating approximated curves for the current set of omitted curves using the first scaling factor, the scaling factor for each such approximated curve is adjusted so as to achieve zero percent average error between the approximated curve and its corresponding curve of curve family 200 (step 313). Thus, for example, using the first scaling factor of 0.9 to generate approximated curve 9 from template curve 10 may result in a non-zero percent average error between approximated curve 9 and curve 9 of curve family 200, for example a positive error, implying that approximated curve 9 is slightly too high. Thus, the first scaling factor may be adjusted to 0.88 (say) so that there is no average error between the approximated and actual curve, i.e. the positive and negative areas between the two curves are equal or substantially equal.

After adjusting the initial scaling factors so that there is zero percent average error between each approximated curve and its corresponding curve of curve family 200, the total percent error (TPE) (i.e., using absolute rather than signed values) is determined for each of the approximated curves generated using the adjusted scaling factor (step 314). For those approximated curves having a TPE of less than the specified amount (e.g. 7%), these curves may be generated using the previous template and the adjusted scaling factor. For example, using curve 10 as a template curve, after adjusting the scaling factors, approximated curves 9, 8, 7, and 6 may have a TPE less than 7%.

For those approximated curves having a TPE of less than the threshold amount (e.g., 7%), such as approximated curves ½, 1, 2, 3, 4, and 5, a new template is selected from the remaining omitted curves (steps 321, 311), whereupon steps 311–314 and 321 are repeated. Thus, for example, curve 5 may be selected as the next template curve. In this case, approximated curves ½, 1, 2, 3, 4 are generated using template curve 5 and a first scaling factor equal to the ratio the curve number of each respective curve and 5 (step 312), said first scaling factors are adjusted to achieve zero percent average error (step 313), and the TPE is determined for each approximated curve generated using the adjusted scaling factors (step 314). As an example, it may be determined that curves 4 and 3 may be adequately approximated using curve 5 as a template curve and adjusted scaling factors, but not curves ½, 1, and 2 (steps 312–314, 321). Repeating steps 311–314 and 321 once more, curve 2 may be selected as the third template curve, and curves ½ and 1 may be approximated by generating them using curve 2 and adjusted scaling factors.

At this point, all curves may be implemented by relay 110 either directly, through use of the template curves (10, 5, and 2) or by generating the omitted curves (9, 8, 7, 6; 4, 3; 1, ½) from a template curve and an appropriately adjusted scaling factor. In this manner, steps 311–314 and 321 are repeated until there are no approximated curves for which TPE is greater than the threshold degree of accuracy (steps 321, 323). Thus, in the present embodiment, ROM 113 need store only the data points for the three template curves (10, 5, and 2), and eight adjusted scaling factors for the omitted curves (9, 8, 7, 6; 4, 3; 1, ½), or a total of approximately (3×18+ 8)=62 bytes (16 bits each) rather than 11×18=198 bytes, a memory savings of approximately 69%.

In one embodiment, the template curve selected in step 311 is the curve having the highest curve number of the curves not yet selected as a template or already qualified as curves that can be generated by a template curve within the threshold degree of accuracy. Thus, in the example above, curve 10 was selected from the curve set {½, 1, 2, 3, 4, 5, 6, 7, 8, 9, 10}; curve 5 was selected in the second iteration from curve set {½, 1, 2, 3, 4, 5}; and curve 2 was selected in the third iteration from curve set {½, 1}. However, in alternative embodiments, other rules may be utilized to select a next template curve in step 311 from the remaining curves, or the selection may be arbitrary. For example, in one empirical example, it may be found that curves 5 and 2 only may serve as template curves, with curve 5 being used along with adjusted scaling factors to generate curves 10, 9, 8, 7, 6, 4, and 3, and curve 2 being used to generate curves 1 and ½.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for configuring a digital overcurrent relay to provide a plurality of selectable time overcurrent characteristic responses corresponding to a plurality of target curves, the method comprising the steps of:
   (a) selecting a template curve from the plurality of target curves;
   (b) generating a scaling factor for each remaining target curve, wherein the relay comprises means for generating approximated curves from a given template curve and a given scaling factor;
   (c) determining whether each approximated curve is within a threshold amount of total error with respect to its corresponding target curve; and
   (d) if any approximated curves are not above the threshold amount, then selecting a further template curve from the plurality of target curves and repeating steps (b)–(c) with said further template curve until no approximated curves are above the threshold amount.

2. The method of claim 1, wherein the scaling factors are generated in step (b) such that an average error measurement between each approximated curve and its corresponding target curve is zero.

3. The method of claim 1, further comprising the step of:
   (e) providing the plurality of target curves in the form of a set of data points representative of each of the target curves.

4. The method of claim 3, wherein step (e) comprises the step of obtaining the sets of data points by plotting the characteristic responses of an existing analog relay device.

5. The method of claim 3, wherein the sets of data points represent each of the target curves within a specified degree of accuracy.

6. The method of claim 3, wherein each target curve is represented by a set of 18 bytes.

7. The method of claim 1, wherein the plurality of target curves is a family of inverse-time characteristic curves.

8. The method of claim 7, wherein:
   each target curve of the family of target curves has a unique time dial setting; and
   step (b) comprises the steps of:
   (1) for each remaining target curve, generating an initial scaling factor corresponding to the ratio of the time dial setting of the respective target curve and the template curve; and
   (2) adjusting the initial scaling factor to provide the scaling factor, so that the average error measurement between each approximated curve and its corresponding target curve is zero.

9. The method of claim 7, wherein:
   each target curve of the family of target curves has a unique time dial setting; and
   step (a) comprises the step of selecting as the template curve the target curve having the highest time dial number of the remaining target curves, wherein the remaining target curves comprise all of the target curves except: target curves already selected as template curves, and target curves for which an approximated curve within a threshold amount of total error has been determined in step (c).

10. The method of claim 7, wherein the family of target curves comprises 11 target curves, each having a unique time dial setting.

11. The method of claim 10, wherein the time dial settings of the 11 target curves are ½, 1, 2, 3, 4, 5, 6, 7, 8, 9, and 10, respectively.

12. The method of claim 1, wherein the threshold amount is 7%.

* * * * *